United States Patent [19]

Hayashi

[11] Patent Number: 4,598,687
[45] Date of Patent: Jul. 8, 1986

[54] INTERCOOLER FOR SUPERCHARGED INTERNAL COMBUSTION ENGINE

[75] Inventor: Yoshimasa Hayashi, Kamakura, Japan

[73] Assignee: Nissan Motor Co., Ltd., Yokohama, Japan

[21] Appl. No.: 657,954

[22] Filed: Oct. 5, 1984

[30] Foreign Application Priority Data

Oct. 26, 1983 [JP] Japan ............................. 58-200361

[51] Int. Cl.⁴ .......................................... F02B 29/04
[52] U.S. Cl. ........................... 123/563; 165/104.27
[58] Field of Search .................... 60/599; 123/563; 165/104.27, 32, 39

[56] References Cited

U.S. PATENT DOCUMENTS 1,480,281  1/1924  Mallory ................ 165/104.27 X
1,662,440  3/1928  Rushmore ............. 165/104.27 X
3,526,270  9/1970  Norton ................. 165/104.27 X

FOREIGN PATENT DOCUMENTS 558399   6/1958  Canada ................. 165/104.27
57-46016  3/1982  Japan .
0150022   9/1983  Japan .................... 60/599
2023797A  1/1980  United Kingdom ....... 60/599
2091343A  7/1982  United Kingdom ....... 60/599

Primary Examiner—Michael Koczo
Assistant Examiner—Randolph A. Smith
Attorney, Agent, or Firm—Schwartz, Jeffery, Schwaab, Mack, Blumenthal & Evans

[57] ABSTRACT

A supercharged engine intercooler includes a coolant jacket in heat exchange with the hot compressed air from the supercharger. The coolant in the jacket is permitted to boil and the vapor condensed in a radiator. The rate of condensation during high engine load is maintained sufficiently high to induce sub-atmospheric pressures within the radiator and coolant jacket which lowers the boiling point of the coolant, while during low load operation the rate of condensation can be reduced to raise the pressure in the coolant jacket and thus the boiling point of the coolant to rise above 100° C. Upon stoppage of the engine, the coolant jacket and radiator are completely filled with liquid coolant to prevent contaminating atmospheric air from leaking into the system.

7 Claims, 6 Drawing Figures

INTERCOOLER FOR SUPERCHARGED INTERNAL COMBUSTION ENGINE

BACKGROUND OF THE INVENTION

1. Field of the Invention

The present invention relates generally to an intercooler for a supercharged internal combustion engine and more specifically to a self-contained intercooler wherein coolant is evaporated under reduced pressure in a manner to utilize the latent heat of vaporization thereof and the vapor used as a vehicle for removing heat from the intercooler.

2. Description of the Prior Art

In order to improve engine performance superchargers especially exhaust gas driven turbochargers are often fitted to internal combustion engines. However, these devices while improving engine performance have encountered drawbacks in that the temperature of the air charged into the cylinders increases due to compression (often as high as 150°–170° C.) which reduces the density of the air thus reducing charging efficiency, and tends to induce knocking (in Otto cycle engines). To solve the latter mentioned problem it is usual to retard the ignition timing and/or lower the compression ratio. This of course also tends to reduce engine power output. Accordingly, it has been proposed to interpose an intercooler between the supercharging compressor and tne engine cylinders in order to reduce the temperature of the incoming charge.

FIG. 1 shows an example of a previously proposed intercooler arrangement. This arrangement is integrated with engine cooling system. In this arrangement coolant from a reservoir 1 is fed to a heat exchanger 2 which forms a vital part of the intercooler 3 and to a pressure pump or compressor 4. The pressurized fluid discharged by the pump 4 is circulated through the engine coolant jacket 5 to absorb the heat produced by the engine. The resulting high pressure-temperature mixture of boiling coolant and vapor is ejected toward a condenser through a variable nozzle jet pump 7. Simultaneously, the liquid coolant fed into the intercooler heat exchanger 2 absorbs heat from the supercharged air passing through the intercooler 3 and vaporizes. This vapor is extracted from the heat exchanger and directed to the condenser 6 under the influence of the venturi action produced by the ejection of the high temperature-pressure liquid/vapor mixture ejected from the variable nozzle jet pump 7. The vaporized coolant is condensed in the condenser 6 and returned to the reservoir 1.

However, this arrangement has encountered several drawbacks in that the compressor 4 consumes valuable engine output, in that it is very difficult to control the temperatures in the system to desired levels with any degree of reliability and in that the liquid coolant fed to the intercooler heat exchanger sometimes becomes excessively heated forming a superheated vapor which lowers the heat exchange efficiency of the intercooler. Further, upon stopping the engine the condensation of the vaporized coolant in the system induces a sub-atmospheric pressure therein which tends to induct air into the system. The system once contaminated with air tends to lose its efficiency due to the pockets and bubbles of air which can absorb little or no heat and which inevitably find their way into the condenser of the system. For further disclosure relating to this device, reference may be had to "MOTOR TREND" published in the U.S. in June 1983 and/or to Japanese Patent Application First Provisional Publication No. Sho 56-146417 (1981)

FIG. 2 shows a second example of previously proposed intercooler disclosed in Japanese Patent Application First Provisional Publication No. Sho 57-46016 laid open to public inspection on Mar. 16, 1982. In this arrangement liquid coolant from the engine radiator is admitted to a heat exchanging device 9 via a valve 10. This valve is controlled by a level sensor 11 in a manner to maintain an essentially constant level of liquid coolant within the device. The hot supercharged air from the turbocharger compressor C, passes over and around a plurality of essentially vertically arranged pipes or conduits 12 containing liquid coolant. A vacuum pump or the like 13 driven by an electric motor 14 (or alternatively by way of a mechanical connection with the engine crankshaft) is used to reduce the pressure within the liquid filled portion of the heat exchanger 9 to a level whereat the coolant boils at a suitably low temperature. The coolant vapor extracted from the heat exchanger by the pump 13 is discharged into the conduit 15 leading from the engine coolant jacket 16 to the engine radiator 8 and permitted to mix with the liquid coolant and condense at essentially atmospheric pressure.

However, this arrangement has suffered from the drawbacks that the vacuum pump 13 is relatively large and bulky consuming valuable engine room space as well as engine power and in that temperature control with respect to engine operation (e.g. engine load) is not taken into consideration.

SUMMARY OF THE INVENTION

It is an object of the present invention to provide an intercooler arrangement which consumes very little engine power, which is efficient and which prevents the intrusion of contaminating air during non-use.

It is a further object of the present invention to provide an intercooler arrangement which can vary the temperature of the air supplied to the combustion chambers with respect to engine operational parameters, such as engine load and/or speed thereby optimizing and/or stabilizing the operation of same.

In brief, the above objects are fulfilled by an arrangement wherein a supercharged engine intercooler includes a coolant jacket in heat exchange with the hot compressed air from the supercharger. The coolant in the jacket is permitted to boil and the vapor condensed in a radiator. The rate of condensation during high engine load is maintained sufficiently high to induce sub-atmospheric pressures within the radiator and coolant jacket which lowers the boiling point of the coolant, while during low load operation the rate of condensation can be reduced to raise the pressure in the coolant to rise above 100° C. Upon stoppage of the engine, the coolant jacket and radiator are completely filled with liquid coolant to prevent contaminating atmospheric air from leaking into the system.

More specifically, the present invention in its broadest sense takes the form of an internal combustion engine having a combustion chamber, an induction passage leading to the combustion chamber, a supercharger for discharging air under pressure into the induction passage, and an intercooler associated with the induction passage for cooling the air discharged by the supercharger, the intercooler comprising a conduit through which the air from the supercharger passes, a coolant jacket disposed about the conduit, the coolant jacket being arranged to receive coolant in its liquid form and discharge some in its gaseous form, a radiator in fluid communication with the coolant jacket for receiving the coolant in its gaseous form and condensing same to its liquid form, a sensor for sensing a parameter which varies with the temperature of the air emitted from the conduit, a device responsive to the sensor for controlling the rate of condensation of the gaseous coolant in the radiator, and a pump for returning condensed liquid coolant from the radiator to the coolant jacket.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
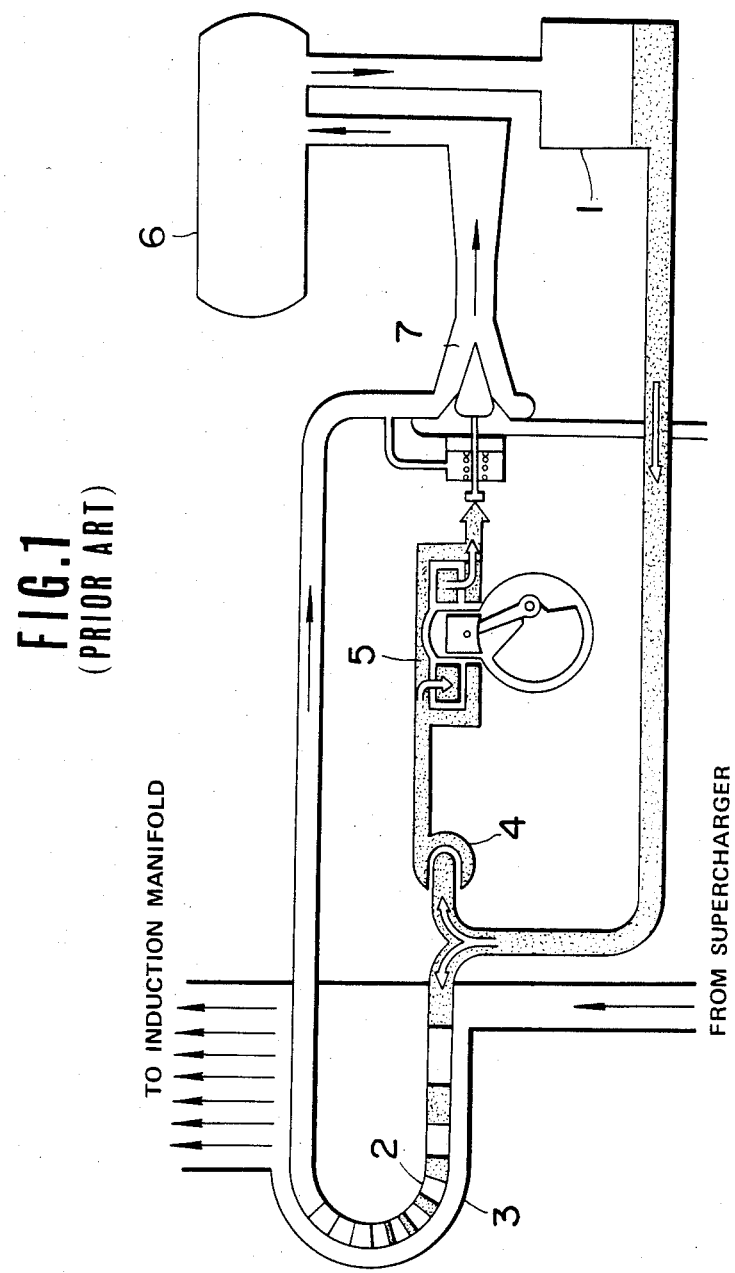
FIGS. 1 and 2 are schematic views of the prior art arrangements referred to in the opening paragraphs of the instant disclosure.
Figure 2:
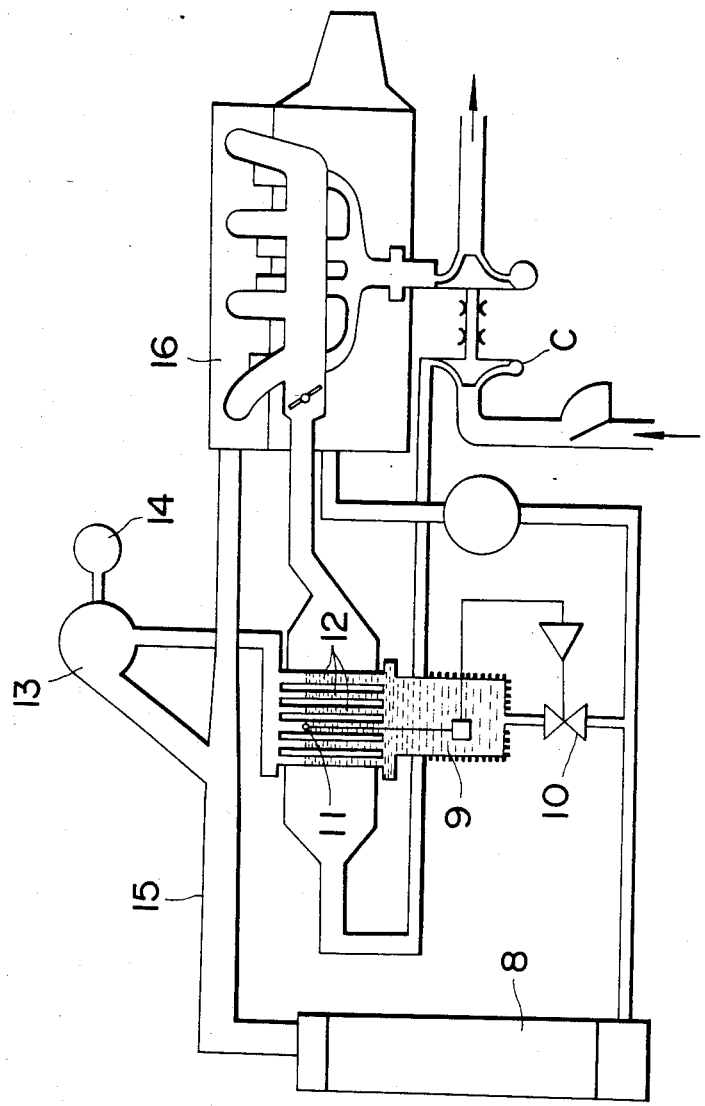
Figure 3:
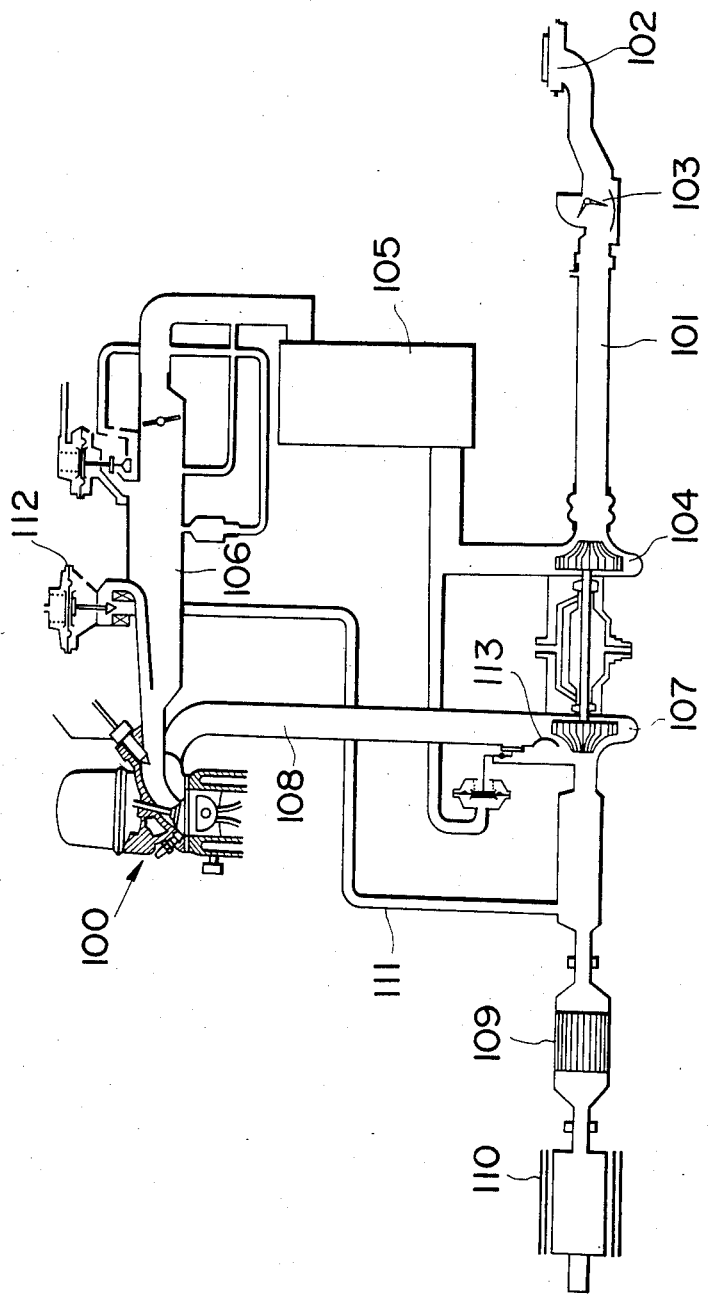
FIG. 3 is a schematic view of an engine system incorporating the present invention.

FIG. 3 shows an engine system in which the present invention is incorporated. As shown, this system includes (merely by way of example) a turbocharged fuel injected spark ignition Otto cycle engine 100. In this arrangement an induction passage or conduit 101 leads from an air cleaner 102 via an air flow meter 103 to the compressor 104 of the turbocharger. The output of the compressor 104 is fed through a self-contained intercooler 105 according to the present invention, to an induction manifold 106. The impeller 107 of the turbocharger is supplied hot exhaust gases from the combustion chamber or chambers of the engine via an exhaust manifold 108. Located downstream of the impeller 107 are catalytic converter 109 and muffler 110. An EGR conduit 111 leads from upstream of the catalytic converter 109 to an EGR valve 112 operatively mounted on the induction manifold 106. A wastegate 113 controlled by the supercharging pressure provided by the compressor 104, by-phase exhaust gases around the impeller 107 in the event of excessive supercharging.

Figure 4:
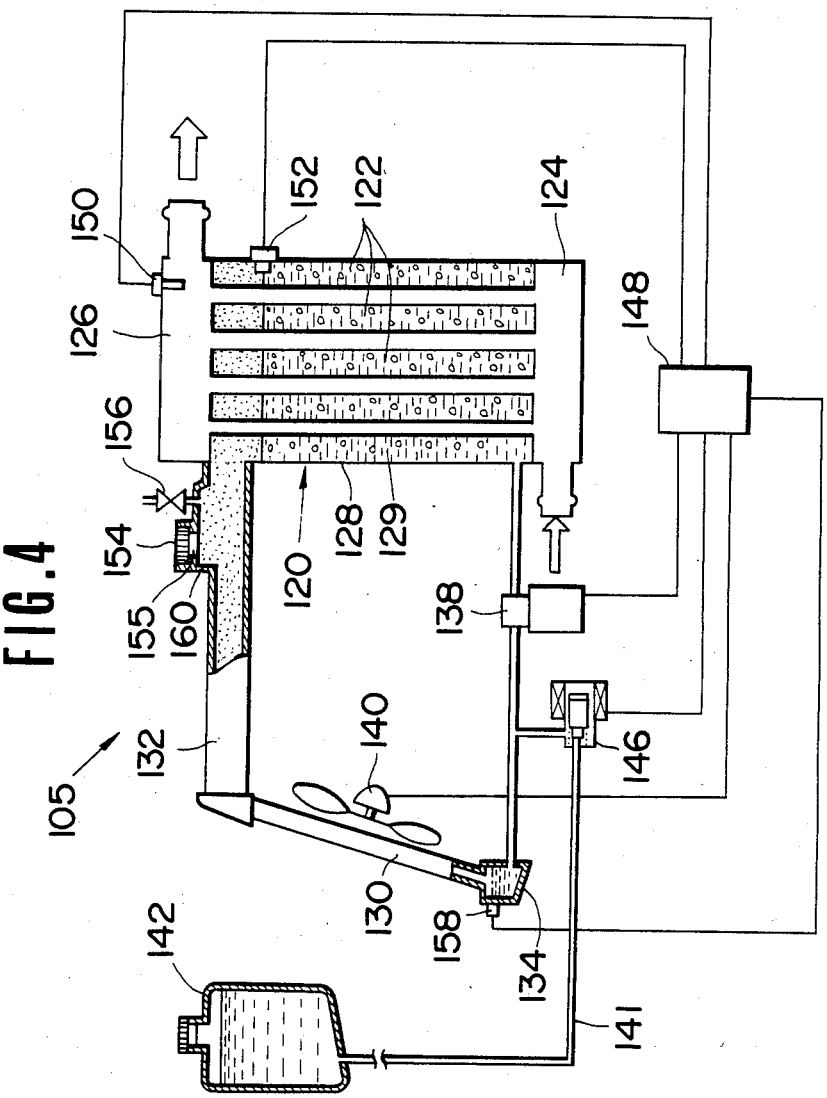
FIG. 4 is a schematic sectional view of an embodiment of the present invention.
Figure 5:
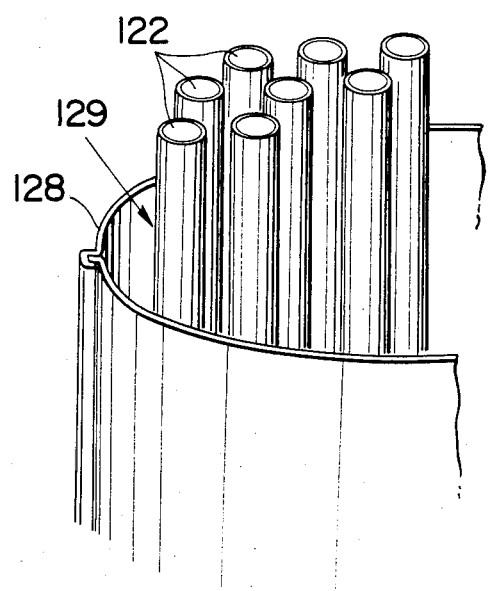
FIG. 5 is a perspective view of the conduiting and coolant jacket which form a vital part of the arrangement shown in FIG. 5.

FIG. 4 shows the intercooler 105 in detail. This device includes a heat exchanger 120 comprised of a plurality of essentially parallel circular cross section tubes or conduits 122 which lead from a lower plenum chamber 124 in fluid communication with the discharge port of the turbo-charger compressor 104 to a chamber 126 in fluid communication with the induction manifold 106. Disposed between the chambers 124 & 126 and about the conduits 122, is a housing 128 which defines a coolant jacket 129 therewithin. The uppermost portion the coolant jacket 129 fluidly communicates with a radiator or condensor 130 via a vapor transfer conduit 132. A small collection reservoir 134 is formed at the bottom of the radiator 130 and fluidly communicated with a lower portion of the coolant jacket 129 via a return conduit. A pump 138 is disposed in the return conduit. A fan 140 located adjacent the radiator 130 is arranged to controllably pass a flow of cooling air thereover.

A reservoir 142 is arranged to fluidly communicate with the return conduit via a supply conduit 141 and electromagnetic valve 146. This valve is arranged to be closed when energized.

A control circuit 148 which controls the operation of the fan 140, pump 138 and valve 146 receives data inputs from a temperature sensor 150 disposed in the chamber 126 for sensing the temperature of the air flowing out of the conduits 122 toward the induction manifold 106 and a level sensor 152 disposed near the top of the coolant jacket 129.

The intercooler 105 also includes a filling cap 154 which hermetically closes a filling port 155 and a normally closed air bleed valve 156.

Before being put into use, the cooling jacket 129 and radiator 130 are completely filled with coolant via the filling port 155 and the cap 154 secured in place. A small additional amount of coolant is placed in the reservoir 142. When the engine is started the heat from the supercharged air flowing through the conduits 122 warms the coolant producing vapor pressure within the coolant jacket 129. This pressure displaces coolant out of the coolant jacket to the reservoir 142 via the supply conduit 141 and valve 146 which is temporarily maintained de-energized. Upon the level of coolant falling to that of the level sensor 152, the latter outputs a signal indicative thereof and the pump 138 energized. This in combination with the increasing vapor pressure within the system as a whole, tends to maintain the level of coolant within the coolant jacket 129 at that of the level sensor 152 while emptying the radiator 130.

A second level sensor 158 is disposed in the collection reservoir 134 and arranged to, upon the level of coolant therein falling below the level at which it is disposed, output a signal which closes valve 146 and terminates the displacement of coolant out of the cooling system of the intercooler which now assumes a "closed circuit" condition.

Subsequently, the fan 140 is energized to induce condensation of the coolant within the radiator 130. This of course reduces the pressure prevailing in the cooling system lowering the temperature at which the coolant boils. This procedure is maintained until the temperature of the air being fed to the induction manifold of the engine is lowered to a predetermined desired level whereafter the fan 140 is intermittently energized in a manner to maintain the rate of condensation in the radiator which maintains the temperature of the air at the desired level.

The present invention further features varying the temperature of the air fed to the combustion chambers of the engine with respect to operational parameters such as engine speed and engine load. When the engine is operating under high load conditions it is preferable to lower the temperature of the air discharged from the intercooler. In order to do this, fan 140 is energized sufficiently to induce a condensation rate which lowers the pressure within the coolant jacket 129 and radiator 130 to a subatmospheric level whereat the coolant boils in the range of 70°–50° C., for example. This cools the air entering the combustion chambers to the point of preventing knocking and the like which is apt to occur especially if air at 170° C. is permitted to be charged into the combustion chambers. As the density of the cooler air is higher than normal engine charging efficiency is also increased while simultaneously obviating the need to retard the ignition timing.

Conversely, when the engine is operating under light load, the fan is energized in a manner that the rate of condensation drops and the pressure in the coolant jacket and radiator exceeds atmospheric. The coolant accordingly boils at temperatures in excess of 100° C. Under these conditions the temperature of the air is increased as compared with high load operation but still is not permitted to reach anywhere near the previously mentioned 170° C. Accordingly, the temperature of the air is such as to promote engine thermal efficiency and therefore fuel economy as well as improve combustion stability.

Upon stopping of the engine, the valve 146 is deenergized and opens. As the pressure within the system falls due to the condensation of the vapor filling the upper region of the coolant jacket 129 and the radiator 130, the coolant which was displaced into the reservoir 142 during warm-up, is transferred back into the coolant jacket and radiator under the influence of the atmospheric pressure acting on the surface of the liquid stored in the reservoir and the sub-atmospheric pressure developing in the cooling system. This fills the coolant jacket and radiator with liquid coolant and eliminates any subatmospheric pressure therein obviating the intrusion of any contaminating air.

It is deemed advantageous to locate the reservoir 142 slightly above the coolant jacket 129 and radiator 130. This not only ensures that the cooling system will completely fill with liquid coolant subsequent to engine shut-down, but also permits any air which finds its way into the system (e.g. the air dissolved in the coolant held in the reservoir) and which collects in a small riser 160 on which the filling port 155 and bleed valve 156 are disposed, to be bled out of the system by a brief opening of the air bleed valve 156.

Alternatively, it is possible to briefly open the valve when the engine is running the pressure in the system to above atmospheric and permit the pressurized vapor to purge out the undesirable non-condensible matter.

It will be noted that it is necessary maintain atmospheric pressure within the reservoir at all times. To this end, the cap of the reservoir is arranged to be air permeable in this embodiment.

Figure 6:
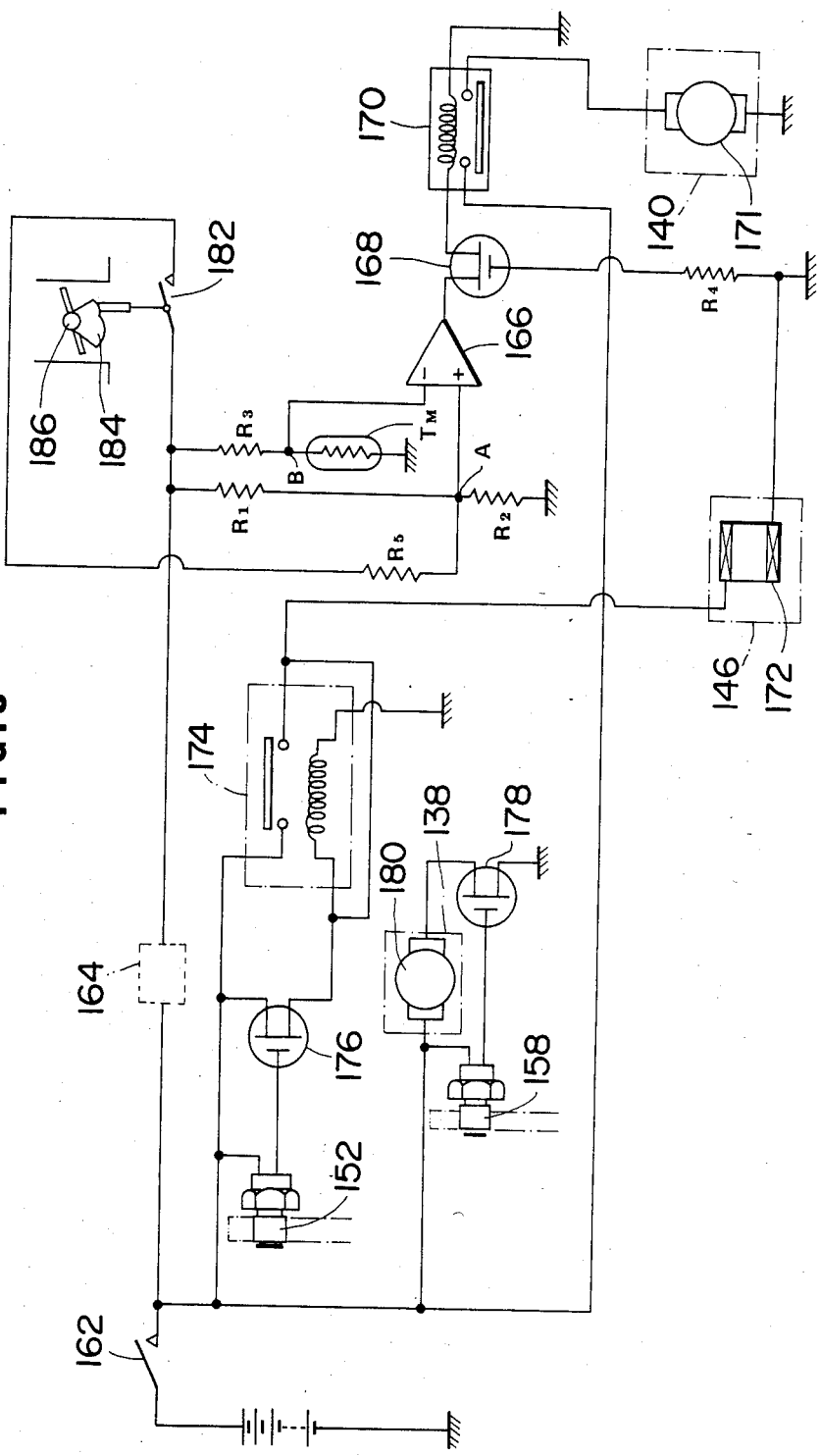
FIG. 6 is a circuit diagram showing an example of circuitry which may be used to control the fan, pump and valves of the arrangement shown in FIG. 4.

FIG. 6 shows a circuit which may be used to control the valve 146, pump 138 and fan 140 in a manner to achieve the above described control.

In this circuit a switch 162 which may be synchronously operable with the ignition switch of the engine with which the intercooler is associated, connects a source of EMF (e.g. the battery of the engine) with a DC—DC converter 164 which supplies a stabilized voltage to a first voltage divider comprised of resistors $R_1$, $R_2$ and a second voltage divider comprised of a fixed resistor $R_3$ and a thermistor $T_M$ which forms the heart of the temperature sensor 150. The voltage appearing on terminal A is fed to the non-inverting input of a comparator 166 while the voltage appearing on terminal B is fed to the inverting terminal of same. The output of the comparator 166 is supplied via transistor 168 to the coil of a relay 170. This relay 170 upon closure, connects the motor 171 of the fan 140 with the source of EMF. The base of the transistor 168 is connected to the solenoid coil 172 of valve 146 through resistor $R_4$. The function of the resistor $R_4$ is to protect the transistor 168 from excessive current. The solenoid coil 172 is arranged to be fed current via a self-energizing relay 174 which is closed when level sensor 152 outputs a signal indicative of the level of coolant in the coolant jacket 129 having fallen below same. This signal renders transistor 176 conductive and supplies current through the coil of the selfenergizing relay 174 closing same. The relay 174 remains closed until switch 162 is opened (viz., the engine is stopped).

Level sensor 158 is connected with the base of a transistor 178 as shown, so that upon the level of coolant falling below that of the sensor 158 the motor 180 of the pump 138 is energized to pump coolant from the radiator 130 into the coolant jacket 129 until the coolant level therein is returned to that at which sensor 152 is disposed.

As will be appreciated until the self-energizing relay 174 is closed to close valve 146 via energization of its solenoid 172, the fan will not be operated due to the non-conductivity of transistor 168.

In order to vary the temperature at which the coolant boils with engine load, a switch 182 operated by a cam 184 mounted on the engine throttle valve shaft 186, is circuited with terminal A via resistor $R_5$. Accordingly, when the throttle is opened beyond a predetermined amount (for example 35°) which represents the boundry between high and load load operation, the switch 182 is closed and the voltage appearing on terminal A increased. Accordingly the frequency with which the fan 140 is energized is increased, increasing the rate of condensation within the radiator 130. By appropriately selecting resistors $R_1$, $R_2$, $R_3$ & $R_5$ the operation of the fan 140 will be ensured each time the temperature of the air passing through chamber 126 exceeds one the two levels determined by the above described circuit, subsequent to the intercooler warm-up process during which the excess liquid collant is displaced therefrom. The voltage appearing on terminal A may be varied in accordance with more than one parameter. For example, a combination of engine speed and load may be used. The voltage appearing on terminal A may also be varied continuously so as to continuously vary the boiling point of the the coolant. This may be achieved by simply using a variable resistor in place of switch 182 for example.

The circuit via which the above can be achieved is deemed well within the perview of one skilled in the art of engine control systems and as such will not be discussed for brevity. Examples of such circuitry are disclosed in applicants co-pending U.S. patent application Ser. No. 692,451 the disclosure of which is hereby incorporated by reference thereto.

It should be noted that with the present invention the most vigorous boiling of the coolant occurs in the lower portions of the conduits 122. Viz., close to chamber 124 into which the heated air from the turbo-charger compressor is first introduced. This stabilizes the boiling phenomenon in the conduits and prevents the formation of super heated vapor and thus maintains an extremely high heat exchange efficiency.

Although disclosed embodiment features a pump arrangement which pumps liquid coolant from the radiator into the coolant jacket each time the coolant level in the coolant jacket 129 falls below that of the level sensor 152, so as to maintain a constant level, it is also within the scope of the present invention to omit the level sensor 152 and continuously operate the pump 138 so that a small amount of coolant continuously overflows out of the coolant jacket 129, collects in reservoir 134 and is subsequently returned to the coolant jacket.

It should also be noted that valve 146 may operated accordingly to a schedule wherein, should excess coolant tend to collect in reservoir 134, it may be selectively opened during running of the engine to permit the excess coolant to be discharged.

What is claimed is:

1. In an internal combustion engine having a combustion chamber:
    an induction passage leading to said combustion chamber;
    a supercharger for discharging air under pressure into said induction passage; and
    an intercooler associated with said induction passage for cooling the air discharged by said supercharger, said intercooler comprising:
    a conduit through which the air from said supercharger passes;
    a coolant jacket disposed about said conduit, said coolant jacket including means for receiving coolant in its liquid form and for discharging coolant in its gaseous form;
    a radiator in fluid communication with said coolant jacket for receiving said coolant in its gaseous form and condensing same to its liquid form;
    a sensor for sensing the temperature of the air emitted from said conduit;
    a device responsive to said sensor for controlling the rate of condensation of said gaseous coolant in said radiator; and
    a pump for returning condensed liquid coolant from said radiator to said coolant jacket.

2. An intercooler as claimed in claim 1, further comprising a first level sensor disposed in said coolant jacket, said pump being responsive to said first level sensor for pumping condensed liquid from said radiator into said coolant jacket in a manner that the level of liquid coolant is maintained at the level of said level sensor.

3. An intercooler as claimed in claim 1, wherein said device includes a fan for causing a flow of cooling air to pass over said radiator, and wherein said sensor takes the form of a temperature sensor disposed in a downstream portion of said intercooler and which senses the temperature of the air flowing from said intercooler toward said combustion chamber.

4. An intercooler as claimed in claim 1, further comprising:
    a second sensor for sensing one of the engine speed and engine load, said device being responsive to said second sensor in a manner to vary the rate of heat exchange between said radiator and a cooling medium surrounding the radiator and thus vary the rate of condensation of gaseous coolant in said radiator.

5. An intercooler as claimed in claim 1, further comprising:
    a reservoir for storing coolant therein; and
    a valve interposed between said reservoir and one of the said coolant jacket and radiator which opens and establishes fluid communication between said reservoir and one of said coolant jacket and said radiator when said internal combustion engine is stopped, said coolant jacket and said radiator being arranged so that when said valve is closed said coolant jacket and said radiator are hermetically sealed off from the ambient atmosphere.

6. An intercooler as claimed in claim 5, further comprising a second level sensor, said second level sensor being located at the bottom of said radiator, said valve being responsive to said second level sensor in a manner to remain open after the engine is started until said second level sensor indicates the level of coolant in said radiator is at that of said second level sensor.

7. An intercooler as claimed in claim 5, wherein said reservoir is located above said radiator and coolant jacket and wherein said intercooler further comprises a second valve which is located at uppermost level of said radiator and said coolant jacket and which may be temporarily opened to permit any non-condensible matter which has collected in the system to be displaced out of said radiator and coolant jacket.

* * * * *